UNITED STATES PATENT OFFICE.

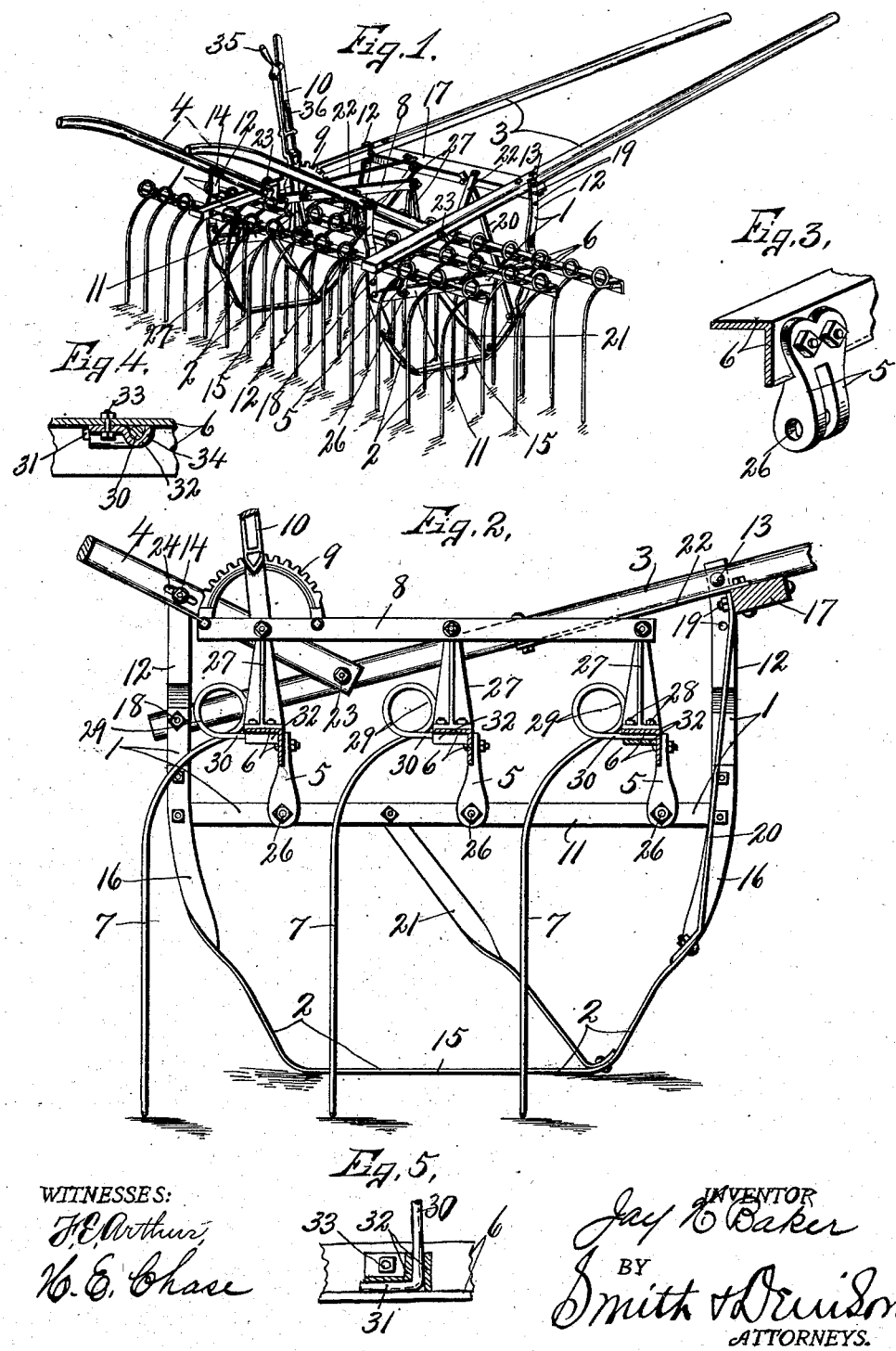

JAY H. BAKER, OF CANASTOTA, NEW YORK.

WEEDER.

SPECIFICATION forming part of Letters Patent No. 718,187, dated January 13, 1903.

Application filed August 21, 1902. Serial No. 120,501. (No model.)

*To all whom it may concern:*

Be it known that I, JAY H. BAKER, of Canastota, in the county of Madison, in the State of New York, have invented new and useful Improvements in Weeders, of which the following, taken in connection with the accompanying drawings, is a full, clear, and exact description.

My invention relates to improvements in agricultural implements, and refers more particularly to a weeder adapted to be operated by animal power.

The primary object of this invention is to mount a series of rocking tooth-supports upon a supporting-frame which is provided with a ground shoe or runner, the tooth-supports and shoe being so relatively arranged that the teeth may be rocked to planes above and beneath the lower face of the shoe for gaging the depth of cut or drag of the teeth into the earth and also to permit the runners or shoes to ride upon the surface of the ground when the teeth are thrown out of action—as, for instance, when driving to or returning from the field or passing from one field to another.

Another object is to mount the rocking tooth-supporting bars in substantially the central portion of the frame and to connect the thills or pole to the frame in front and at the rear of the tooth-supporting bars, so that the strain is distributed from front to rear of the frame.

A further object is to connect the several tooth-supporting bars in such manner that they may all be operated simultaneously by a single operating member, and a still further object is to provide a simple and efficient means for adjusting the height of the thills or poles for different heights of horses, so that the shoes and teeth may always move in a plane substantially parallel with the surface of the ground.

Further objects of my invention will appear in the description.

Referring to the drawings, Figure 1 is a perspective view of my improved weeder. Fig. 2 is a longitudinal vertical sectional view, partly broken away, showing the essential features of this invention. Fig. 3 is a detail view of a portion of one of the tooth-supporting bars and one of the hinge members secured thereto. Fig. 4 is a sectional view of a portion of a tooth-supporting bar, showing one of the tooth-clamps. Fig. 5 is an inverted view of the parts seen in Fig. 4.

Similar reference characters indicate corresponding parts in all the views.

In carrying out the objects of this invention I provide a pair of separated substantially parallel U-shaped bars 1, ground-shoes or runner-bars 2, draft bars or thills 3, handles 4, a plurality of arms 5, tooth-supporting bars 6, secured to said rock-arms, spring-teeth 7, secured to the tooth-supporting bars, and means, such as a link 8, rack 9, and lever 10, for varying the position of the tooth-supporting bars and the teeth mounted thereon.

The U-shaped bars 1 are arranged parallel with the line of draft, and each consists of a substantially horizontal portion 11, having its opposite ends 12 bent upwardly, the forward ends being adjustably secured to the draft-bars 3 by suitable fastening means, as bolts 13, and the rear arms 12 are adjustably secured to the handle-bars by fastening means, as bolts 14.

I preferably provide a shoe or a running-bar 2 for each of the bars 1, each of these shoes also consisting of a substantially U-shaped bar having a horizontal portion 15 and upwardly-extending arms 16, which are lapped upon and secured to the upright portions 12 of the bar 1 at their junction with the horizontal portion 11.

The lower ends of the front and rear upright portions 16 preferably incline downwardly and inwardly toward each other, the horizontal portion 15 being adapted to ride upon the surface of the ground, and in order to facilitate its free movement along the ground its opposite ends are curved upwardly at their junction with the lower ends of the arms 16.

The draft-bars 3 form the thills or pole of the weeder and are united to each other by a suitable cross-bar 17, in front of the upright arms 12 of the U-shaped bars 1 and preferably abutting against the upper ends of said arms to strengthen and stiffen the frame of the weeder. These draft-bars 3 preferably extend rearwardly from their points of securement with the front arms 12 and are pivotally secured at 18 to the rear arms 12 at a point between the fastening means 14 and adjacent end of the horizontal portion 11. The object of securing these draft-bars 3 to the front and rear arms 12 is to stiffen the frame and to distribute the strain from one arm to the other, so that the draft is substantially equal at both ends of the weeder-frame, it being understood that the U-shaped bars 1 and draft-bars 3 constitute the main supporting-frame for the shoes and for the other movable parts hereinafter described.

As previously stated, the rear ends of the draft-bars are pivotally secured at 18 to the rear arms 12, the opposite ends of the said bars being adjustably secured by the fastening means 13 to the front arms 12 of the frame 1, said front arms 12 being provided with a series of apertures 19, disposed one above the other, to receive the fastening-bolt 13, whereby the front ends of the draft-bars 3 may be raised or lowered to suit the different heights of horses for the purpose of maintaining the shoes 15 and lower ends of the teeth 7 in a substantially horizontal position parallel with the surface of the ground.

In order to further stiffen and strengthen the shoe 2, which is subjected to considerable strain by being drawn along the surface of the ground, I provide braces 20 and 21, the lower ends of the braces 20 being secured to the intermediate portion of the front arm 16, and their upper ends are secured to the cross-bar 17 between the draft-bars 3, so as to brace the shoe against lateral strain.

The braces 21 are secured at their lower ends to the shoe 2 at the junction of the parts 15 with the arms 16, and their upper ends are secured to the intermediate portions of the horizontal portions 11 of the U-shaped bars 1, thus bracing the shoe against forward and rearward strains. The connections between the draft-bars 3 and cross-bar 17 are also reinforced by suitable braces 22, Figs. 1 and 2.

The handle-bars 4 are adapted to be engaged by the operator or attendant for guiding the machine and are pivoted at their forward ends at 23 to the inner faces of the draft-bars 3 at points between the front and rear arms 12 and extend rearwardly beyond the rear arms 12, to which they are adjustably connected by the bolts 14, each of said arms being provided with a lengthwise slot 24 for receiving one of the bolts 14. The purpose of this latter adjustment is to permit the adjustment of the front ends of the draft-bars 3, as previously described, it being evident that, owing to the fact that the rear ends of the draft-bars are pivotally secured to the rear arms 12 and that the front ends of the handle-bars are pivotally connected to the draft-bars, when the front ends of the draft-bars are raised and lowered the handle-bars will necessarily move relatively to the rear arms 12, and the slot 24 permits this movement.

Each of the horizontal portions 11 of the U-shaped bars 1 is provided with a series of rock-arms 5, which are arranged one in advance of the other and are pivoted at their lower ends at 26 to said horizontal portion 11.

The axes of movement of the corresponding arms 5 of each bar 1 are substantially coincident. Secured to the upper ends of these rock-arms 5 are the tooth-supporting bars 6, each of which consists of an angle-iron one flange of which is secured to the corresponding arms 5 of each bar 1 and the other flange is adapted to receive and support a suitable bracket 27, said brackets being rigidly secured to the bars 6 by fastening means, as bolts 28.

I preferably provide a number of teeth 7 for each tooth-supporting bar 6, each of which is provided at its upper end with a coil 29 and an inwardly-extending arm 30, having an offset 31, the arm 30 and offset 31 being engaged with the lower face of one of the flanges of the bar 6 and firmly held in position by clamps 32. Each of these clamps is secured to its corresponding bar 6 by fastening means, as a bolt 33, and is provided with a hook-shaped extremity 34, which receives and closely fits upon the arm 30 and holds the same against the inner face of the bar 6. The opposite ends of these bars curve rearwardly and downwardly, and their lower ends are disposed in a substantially vertical position when in operation, as seen in Fig. 2. The link 8 is pivotally connected to the upper ends of the brackets 27 and is provided with a toothed rack 9, coöperating with a suitable detent upon the lever 10 for holding the teeth in their adjusted position. This lever 10 forms a continuation of one of the brackets, as the rear bracket 27, and is provided with means, as a hand-lever 35 and spring 36, Fig. 1, for controlling the operation of the detent which engages the teeth of the rack 9.

It is apparent from the foregoing description that the tooth-supporting bars are arranged substantially parallel with each other transversely of the line of draft and between the front and rear arms 12 of the bar 1, thus distributing the load or weight of the major part of the mechanism directly over the horizontal portion 15 of the shoe 2. This arrangement facilitates the draft of the device over the surface of the ground and serves also to distribute the strain uniformly to all parts of the machine during the operation of weeding.

In the operation of my improved weeder the depth of the cut or dig of the teeth 7 is adjusted by means of the parts 8, 9, and 10 and their connections with the tooth-supporting bars 6 and rock-arms 5, and when the device is being drawn the shoe 15 rides upon the surface of the ground.

When it is desired to move the device from one locality to another without weeding, the teeth 7 are elevated above the shoe 15 by simply rocking the tooth-supports forwardly in the manner previously described.

The operation of my invention will now be readily understood upon reference to the foregoing description and the accompanying drawings, and it will be noted that the shoe 15, riding upon the surface of the ground during the operation of the weeding, serves not only to relieve any undue strain upon the teeth, but also gages the depth of cut of said teeth.

Having thus described my invention, what I claim, and desire to secure by Letters Patent, is—

1. In a weeder, the combination of a pair of U-shaped shoes arranged parallel with the line of draft and having their opposite ends projecting upwardly, substantially horizontal bars uniting the upper ends of the shoes, tooth-supporting bars pivotally connected to the horizontal bar one in advance of the other between the upright ends of the shoe-bars, and means for rocking the tooth-supporting bars simultaneously to elevate and depress the teeth.

2. In a weeder, the combination of a pair of shoes arranged substantially parallel with the line of draft and having their opposite ends extending upwardly, upright arms secured to the opposite upright ends of the shoes, a substantially horizontal bar secured to said upright arms, tooth-supporting bars pivotally connected to the intermediate portion of said horizontal bars, means for rocking said tooth-supporting bars and draft-bars having their rear ends pivotally connected to the rear upright arms and their front ends adjustably secured to the front upright arms.

3. In a weeder, the combination of a substantially horizontal bar, arms projecting upwardly from the opposite ends of said bar, tooth-supports pivotally connected to the horizontal bar, means for rocking said supports simultaneously and holding them in their adjusted position and a shoe secured to the opposite ends of said bar and depending therefrom.

4. In a weeder, the combination of a substantially horizontal bar, arms projecting upwardly from the opposite ends of said bar, tooth-supports pivotally connected to the horizontal bar, means for rocking said supports simultaneously and holding them in their adjusted position, draft-bars having their rear ends pivotally secured to the rear upright arms and their front ends adjustably secured to the front upright arms and handle-bars pivotally connected to the draft-bars and adjustably connected to the rear upright arms.

5. In a weeder, the combination of a pair of U-shaped bars arranged substantially parallel with the line of draft and having their opposite ends turned upwardly, shoes consisting of U-shaped bars having their opposite ends turned upwardly and secured to the former bars, tooth-supports pivotally connected to the intermediate portions of the former bars between their upturned ends, the link pivotally connected to rock said supports simultaneously, means to operate the link and to hold the same in its adjusted position, draft-bars having their rear ends pivotally secured to the upright arms of the former bars and their front ends adjustably secured to the front upright arms and handle-bars pivotally connected to the draft-bars and adjustably connected to the upper ends of the rear arms of the former bars.

In witness whereof I have hereunto set my hand this 16th day of August, 1902.

JAY H. BAKER.

Witnesses:
M. E. BARLOW,
K. H. BAKER.